United States Patent [19]

Dorr et al.

[11] 3,825,726

[45] July 23, 1974

[54] MULTIPLE FORMATTING FOR RECORD-CONTROLLED MACHINES

[75] Inventors: Richard L. Dorr, Rochester, Minn.; Edward G. Ihnot, Endwell, N.Y.; Malcolm E. Varner, Rochester, Minn.

[73] Assignee: International Business Machines Corporation, Armonk, N.Y.

[22] Filed: Apr. 18, 1973

[21] Appl. No.: 352,392

[52] U.S. Cl. .......................... 235/61.6 R, 340/172.5

[51] Int. Cl. .......................... G06k 15/00, G06f 7/00

[58] Field of Search ... 235/61.6 R, 61.6 E, 61.11 A, 235/61.7 R; 340/172.5

[56] References Cited

UNITED STATES PATENTS

| | | | |
|---|---|---|---|
| 2,944,733 | 7/1960 | Austin | 235/61.6 R |
| 3,072,238 | 1/1963 | Chan | 235/61.11 A |
| 3,088,666 | 5/1963 | Clarke | 235/61.11 A |
| 3,447,134 | 5/1969 | Thompson et al. | 235/61.6 R |

*Primary Examiner*—Daryl W. Cook

*Attorney, Agent, or Firm*—J. Michael Anglin

[57] ABSTRACT

A mark-reading machine, or other record-controlled device, produces an output record from indicia on a data documents, in accordance with specifications on one of a number of format documents. The data documents contain selection indicia, such as preprinted marks, for identifying which of the format documents applies thereto.

14 Claims, 10 Drawing Figures

MULTIPLE FORMATTING FOR RECORD-CONTROLLED MACHINES

BACKGROUND OF THE INVENTION

The present invention relates to record-controlled machines and records therefor. The invention will be described in a specific embodiment for reading visible marks on documents. It is applicable, however, to other types of data-conversion devices and to other media which serve the function of records.

The present invention is an improvement of that claimed in U.S. Pat. application Ser. No. 352,393, filed on even date herewith by R. L. Dorr et al. The invention of the above-mentioned Application represents a significant contribution in the use of a format document to describe the contents and arrangement of data documents to a reading machine. In that invention, every batch of data documents must be of the same type, and must be preceded by a format document relating to the particular attributes of that document type. There are may applications, however, where it is inconvenient to separate different data documents into different batches by type, and to read each type separately. Such a separation involves low-grade mental drudgery of exactly the kind which automatic data-processing equipment should prevent.

SUMMARY OF THE INVENTION

The present invention overcomes these and other disadvantages of prior devices by allowing intermixed data documents of different types, having different contents and layouts, to be read in the same batch without requiring any manual separation. To this end, the invention provides a system wherein a data document carries both data indicia to be assembled into an output record, and format-selection indicia for specifying its type. A plurality of format documents each carries designation indicia identifying it with one type of data document. Thus, the data record for each data document may be constructed or assembled in accordance with the appropriate format. The invention also provides a method involving the use of stored format tables which are individually accessible by signals derived from the format-selection indicia.

SYSTEM OPERATION

Figure 1:
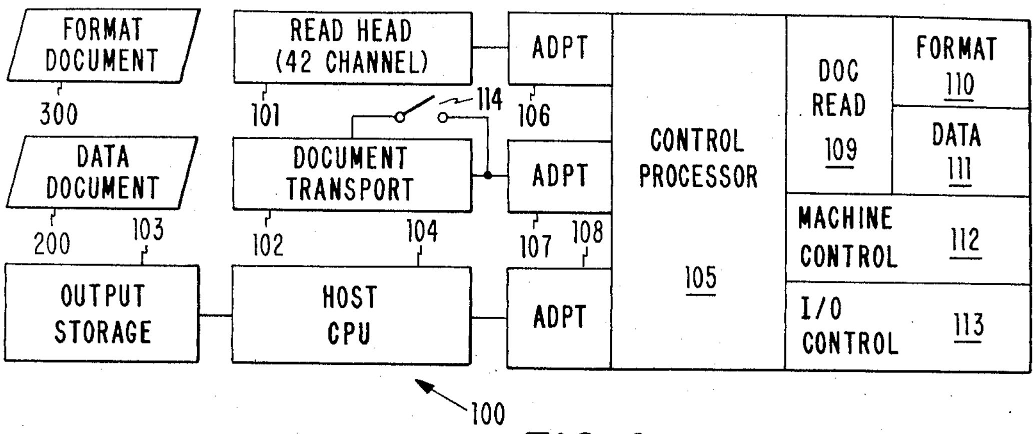
FIG. 1 is a simplified schematic of an overall system according to the invention.

FIG. 1 is a schematic diagram of a machine 100 according to the invention for reading handprinted or machine printed marks on documents. Optical read head 101 contains 42 parallel photodetector channels or columns for converting the optical marks on documents 200 and 300 into electrical signals. Transport mechanism 102 is a conventional device for moving documents 200 and 300 sequentially past read head 102. Output storage unit 103 may be a tape or disk drive for storing digital representations of the document marks. In some machines 100, a host central processing unit (CPU) 104 may be employed for effecting the storage of output data and for other control purposes; in other machines, CPU 104 may be eliminated, so that data is stored directly into unit 103.

A special-purpose microprogrammed control processor 105 is coupled to the units 101, 102 and 104 (or directly to 103) through data adapters 106–108, which may be of conventional design. Adapter 106 thresholds the analog signals from read head 101 to produce 82 binary signals, 40 representing the presence of black marks in each of the 40 data channels, 40 representing gray marks in these channels, and 2 denoting black timing marks in each of 2 separate timing-mark (TM) channels. Adapter 107 contains drivers, sensor interfaces and logic for transferring signals from and to transport 102. Adapter 108 has circuits for interfacing to CPU 104 (in on-line machines) or directly to output storage 103 (off-line machines).

Control processor 105 has facilities 109 for reading documents by manipulating the signals from read head 101. Format-sheet interpreter 110 manipulates signals from format sheets 300 so that data-sheet interpreter 111 may arrange the signals from data documents 200 into the proper output configuration for transmission from adapter 108. Machine-control facility 112 manipulates signals for controlling transport 102. Input/output (I/O) control facility 113 handles the interface to the unit (103 or 104) which is coupled to adapter 108; one of its major functions is to transmit the output signals developed by interpreter 111. Facilities 112, 113 are of conventional design.

In the particular embodiment to be described more fully hereinbelow, facilities 109–113 are implemented in the form of a fixed transistor or diode array operating as a conventional read-only storage (ROS). Processor 105 then sequentially employs groups of these transistors or diodes to determine the settings of various logic gates within the processor. Such an implementation is preferred for this and other control applications because of its flexibility, serviceability and lower cost when compared with random-logic circuits. The present invention, however, does not depend upon this type of implementation. It may alternatively be embodied as random digitial or analog circuits, as programming for a general-purpose data processor, or possibly even in non-electrical forms. In a "hard-wired" machine, units 105–113 may be considered to be circuits or other devices whose functions are described in FIGS. 5–9. The conversion of operational descriptions into circuit diagrams is a routine matter.

Figure 2:
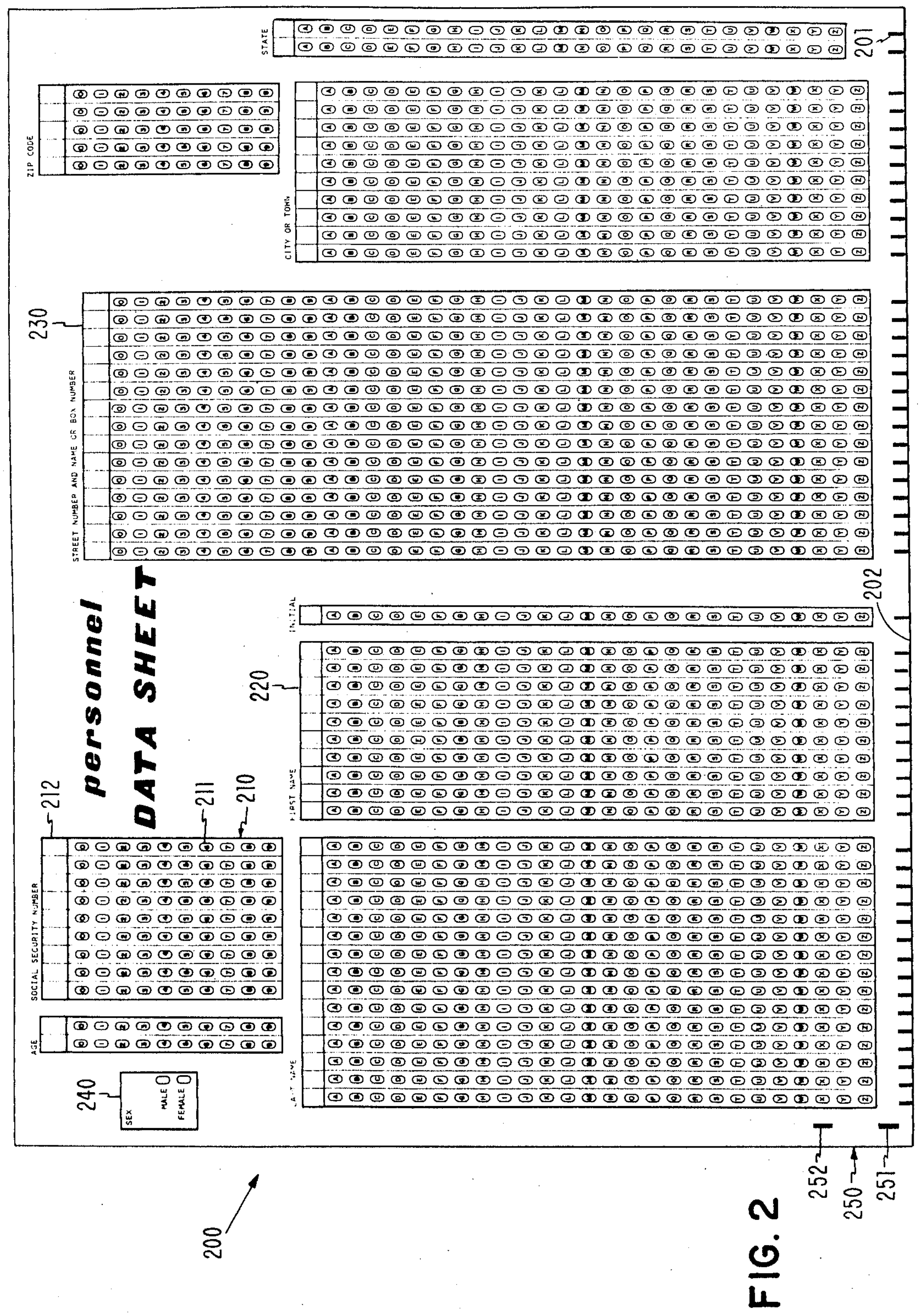
FIG. 2 shows an example of a data document useful in the invention.

FIG. 2 shows a typical data document 200 for handprinted marks. This document contains several separate fields of data, each having its own location and coding. Each row which may contain a data mark is identified by a timing mark 201 along one edge, in a column TM1. A second timing-mark column TM2 is left blank. Since the read-head photodetectors are placed at 0.200 inch increments across the width of a document, locations following the TM1 and TM2 columns in this direction may be given a column number from 1 to 40. Therefore, the location of each rectangular data field may be specified by four numbers indicative of the first and last rows and the first and last columns of the field. Field 210, for instance, extends from row 7 to row 15, between columns 29 and 38. The mark locations or bubbles 211 contain the numerals 0–9 in each row, since each row represents a decimal digit. An extra row of boxes 212 permits the user to write in the digit marked in each row. These digits do not produce spurious mark signals because they are outside the locations defined for field 210. Field 220, defined between rows 1–26 and columns 1–26, is a "name" field having alphabetic characters in each of the bubbles. The field may be broken into visually separated areas for clarity, since the timing marks are correspondingly separated at spaces 202. Note that fields 210 and 220 have common rows, but are located in different columns.

Field 230 requests data which may be both alphabetic and numeric (alphanumeric), so that it extends across 36 columns. Field 230 shares columns with both field 210 and field 220, but it lies in a different range of row numbers, namely, rows 27–41. Field 240 occupies a single row (2) and only two columns (33, 34). Its two mark positions may nevertheless be coded as a numeric digit, 0 for the "male" response and 1 for "female." The designation of this field as a numeric field thus does not require that it occupy 10 columns, which would interfere with its location vis a vis field 220. Document 200 is preferably printed with a reflective ink which is visible to the eye but is not detected by read head 101, except that timing marks 201 must of course be detected by the read head.

Data document 200 also shows a format designation, indicated generally by 250. As will be explained, a timing mark 251 in column TM2 of a data document signifies to reader 100 that one of the "alternate formats" is to be used in interpreting the data document. Preprinted mark 252 in the same row identifies which one of the alternates applies.

Figure 3:
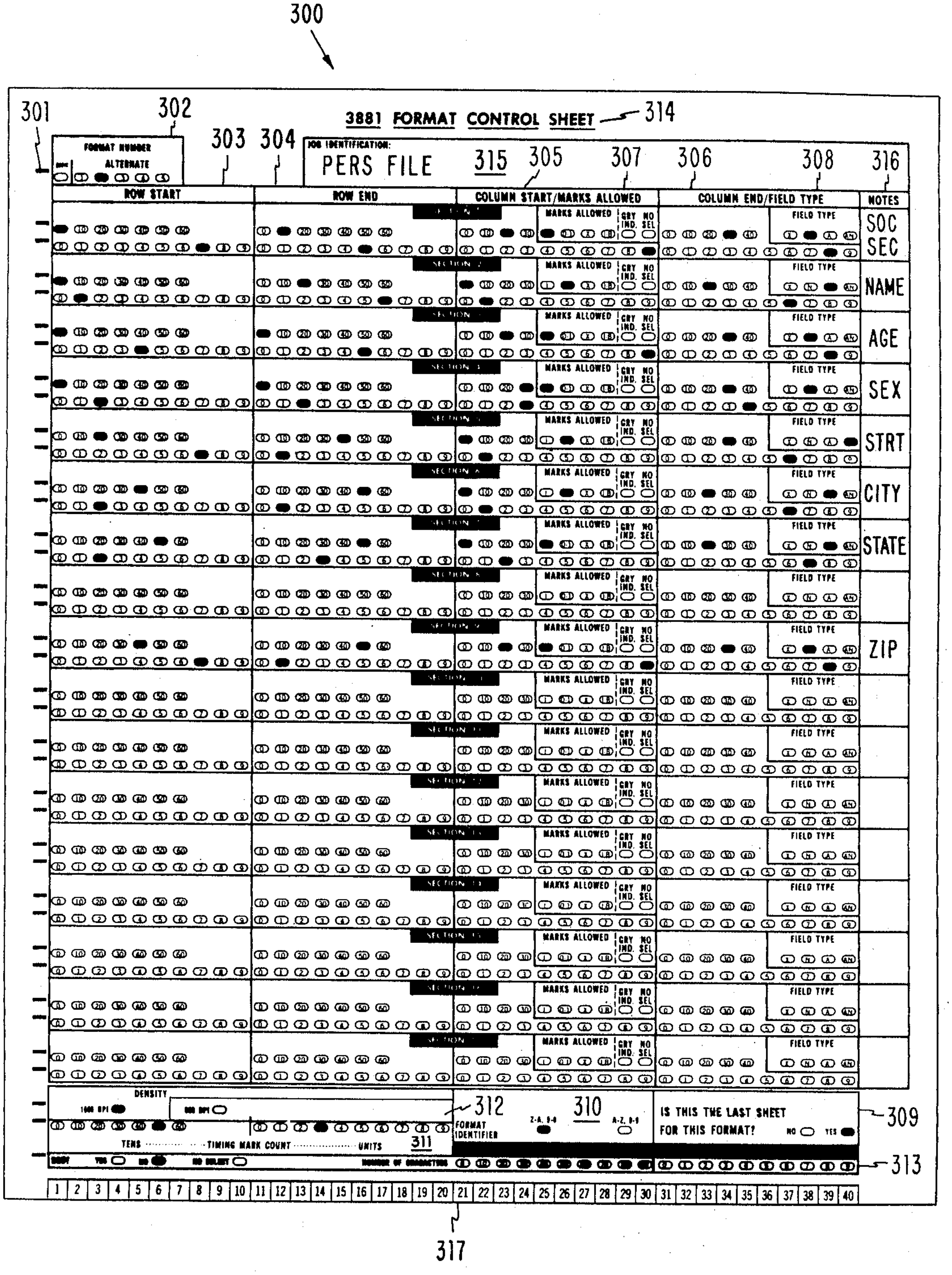
FIG. 3 shows a format document.

Format documents 300, FIG. 3, specifies the field locations, coding and other information about a data document such as that shown in FIG. 2. This document is identified as a format sheet by placing its timing marks 301 in column TM2, away from the document edge. It is also printed with a reflective ink, except for timing marks 301.

Since mark reader 100 can accommodate formats for up to six different types of intermixed data documents in a single run, field 301 first asks whether document 300 is to specify a basic format or one of five alternate formats. For a first data field in this format, format-sheet field 303 designates the data-sheet row, from 1–69, in which that field starts. Field 304 similarly designates the last row of the data-sheet field. Format fields 305 and 306 determine the columns in which the data-sheet field starts and ends, respectively. Format field 307 specifies the types of marks allowed in the data sheet field. Marks in this field may indicate that one and only one mark is permitted in each row of the data-sheet field, that either no marks or one mark is permitted in each row, that any number of marks may be present, or that, if the first row of the field has a mark, then the remaining rows must have exactly one mark each. Field 307 also specifies whether or not light or "gray" marks are acceptable, and whether data documents containing errors are to be diverted to a separate output stacker on the transport. Finally, format field 308 is marked to indicate the type of output coding to be used for the data-sheet field. The options are numeric only (N), alphabetic only (A), alphanumeric (A/N) and image mode (X/N). The image mode merely transmits marks in the form they are received from the data document, without any coding; it may be employed when the user desires to establish his own coding for special applications.

Format-fields 303–308 are duplicated on document 300, to allow the specification of 17 data-sheet fields. A greater number of data-sheet fields, however, may be provided by marking the "NO" bubble of field 309 to indicate that further format sheets will apply to the same data document. The various data-sheet fields may be specified in any order on format sheet 300, and blank format-sheet sections are permitted. This feature permits the insertion, deletion and modification of data-sheet fields without redoing the entire format sheet.

Format fields 310–312 apply to the entire data document whose format is determined by field 310. Field 310 asks whether the order of the bubble characters is normal (A, B, C, —, Z, 0, 1, —, 9) or reversed (Z, Y, —, A, 9, 8, —, 0) on the data sheet, beginning with lowest numbered column in each field. As an error check, format field 311 requests the total number of timing marks on the data sheet. Field 312 selects one of two densities for recording the output data onto magnetic tape in the off-line model of machine 100.

As an optional feature, the data documents of a particular format may contain fields of BCD-coded, machine-printed marks which are self-clocking in that separate timing marks are not required for each data row. Format-sheet field 313 specifies whether or not such a field is present, and the expected number of BCD characters, for error-checking purposes. It also asks whether a data sheet having a BCD-field error is to not be selected, i.e., sent to a different output stacker. ("Select" is a polite word for "reject.")

Format sheet 300 carries a label 314 to identify it as such to the machine operator, and has spaces 315 and 316 for notes as to the name of the data document specified by the format sheet and the meaning of the various data-sheet fields. A guide 317 printed along one edge aids the machine operator in determining column numbers on the data sheets. To use the guide, the left edge of format document 300 is aligned with the left edge of a data sheet such as 200, with the bottom of the format sheet just above the data-sheet row to be measured. The column or read-head channel number of a desired data-sheet mark bubble then corresponds to the number appearing just above that bubble on guide 317. Although not shown in FIG. 3, the reverse side of format document 300 may be printed with directions for its use, so that the operator need not refer to a separate manual or other source in order to fill out a format specification.

Since the different lateral positions of timing marks 201 and 301 enable reader 100 to distinguish between data sheets 200 and format sheets 300, it would be possible to use these identifying marks alone to control the operation of the reader, thus allowing the two types of document to be intermixed. As a safety feature, however, the processing of format documents is not enabled unless a "Format Load" switch 114 is manually set. This switch merely produces a signal which is sensed as a flag bit by processor 105. This prevents errors from the inadvertent presence of a format sheet in a stack of data sheets. It also allows the use of timing marks 301 for specifying alternate formats when the "Format Load" switch 114 is off, as will be described.

The operation of system 100 thus comprises filling out one or more format sheets 300, setting switch 114 to its "Load Format" position, placing the sheets 300 in transport 102 and starting it. After the format sheets have been read, switch 114 is reset to an "off" position, data sheets 200 are loaded into the transport and it is again started. Basically, then machine 100 has only two operator controls, one for starting the transport and one for enabling the reading of format documents. The rest of the "control panel" is on the format sheets.

Again, the use of a mark-read document for format specification requires only the format document itself and a pencil in order to instruct a mark reader, character reader or other type of scanner as to how it is to interpret data documents. This is indeed high-level programming of a sort which is rarely found in even the most sophisticated data-processing machine.

SYSTEM OPERATION

Figure 5:
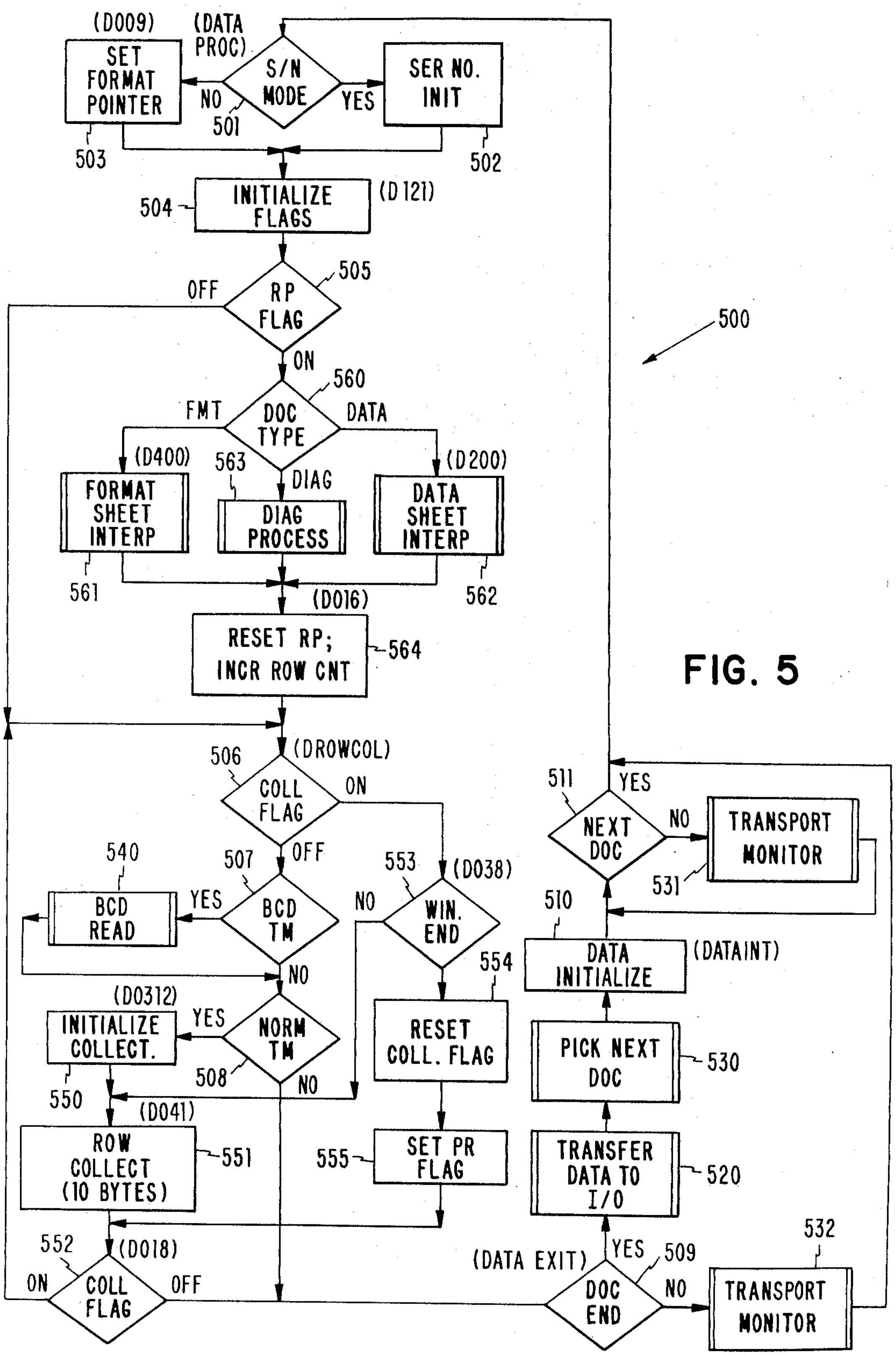
FIG. 5 portrays an overall method of carrying out the invention.

The facilities 109–113, FIG. 1, cause control processor 105 to operate in a continuously cycling loop 500, FIG. 5.

At the beginning of each new document, block 501 determines whether it is a document for loading a serial number into machine 100, and block 502 carries out this function. These blocks do not concern the present invention. When no serial numbering is required, block 503 sets a storage-word format pointer to a current format-start address. Block 504 sets certain stored flag bits to predetermined initial values. Block 505 then asks whether row processing (RP) is to be performed, by interrogating one of these flags. Row processing is the interpretation of the marks or other indicia in a single row of a document such as 200 or 300, after that row has been scanned and stored in a buffer.

Since the RP flag is off at the start of a new document, block 506 determines whether row collection must be performed. Row collection refers to the operation of placing a single row of document marks into predetermined locations of a storage buffer after encountering the timing mark (TM) for that row. The collection flag is off at the beginning of every new document, and no TM's have yet been encountered. Blocks 507 and 508 thus cause loop 500 to determine, in block 509, if the end of the present document has been reached. If so, block 520 causes any data from the document to be transferred through adapter 108, FIG. 1, to an I/O device such as CPU 104 or data storage 103. Block 520 corresponds to I/O control 113, and does not form a part of the present invention. Block 530 then causes transport 102 to pick the next document and carry it to read head 101. Block 510 initializes data in the buffers and flag locations to the proper values for the next document, and calculates a set of field pointers as will be described mory fully in connection with FIGS. 7–9. Block 510 also calculates the length, in bytes, of the storage required for each data-sheet field. Since A, N and A/N coding produces one byte per row, the length for these fields is merely the number of rows in the field. But, for an X/N coded field, the output-record storage length is given by the formula: (1/7) (Col.End-Col. Start + 7) (RowEnd-RowStart +1). Block 511 closes the loop to block 501 when the next document arrives at read head 101. While the document is progressing toward the read head, monitor 531 checks the transport 102 for jams and other mechanical conditions. Since block 531 loops back through block 511, these checks are repeated until the new document is in a proper position to be read.

The above sequence of events would occur in the stated order if the document being read were completely blank. Normally, however, block 509 does not sense an end-of-document condition at this point. The loop 500 is then closed directly through transport monitor 532, which provides the same functions as monitor 531. Blocks 520–532 are conventional and do not relate to the present invention.

As the document continues to move through read head 101, loop 500 cycles through steps 501, 503–509 and 532 until the first TM is detected. If this mark is a BCD TM occupying both the TM1 and TM2 columns on the document, block 507 passes control to block 540 for processing this special type of field, a part of which is specified on the data documents. This block is explained more fully in co-pending U.S. Pat. application Ser. No. 250,266, filed May 4, 1972 by K. W. Cash et al. Block 540 is an optional feature which is essentially another embodiment of the invention, complete with its own formatting, row-collection and row-processing facilities. Block 508 detects the presence of "normal" TM's, i.e., those which extend across either of the TM1 and TM2 columns, but not both. Block 507 and 508 also set stored flag bits for further use.

For a normal TM, block 550 initializes the proper buffer to zero, since the row is placed in the buffer by a logical OR function with its existing contents. Block 550 also starts a window timer which represents a predetermined travel distance of the document through the read head. Row-Collect block 551 OR's 10 bytes of data from read-head adapter 106 into a data buffer. The 80 bits of this data represent a black-mark bit and a gray-mark bit for each of the 40 data columns or channels. No distinction is made at this point as to whether any such data is included in any of the defined fields on the document. Block 552 then accesses block 553 via block 506. If the end of the row window has not been reached, block 551 continues to OR read-head data into the buffer on each traversal of the blocks 551, 552, 506, 553, 551, etc. This method allows for misregistration between the data marks and their associated timing mark. It also alleviates the requirement for sharp leading edges on the TMs and makes their width non-critical. Minor imperfections in the TM's will therefore not close down the entire row-collection operation. As long as some part of a TM qualifies as a "black" mark, it will initiate the collection of a data row. On the other hand, the elimination of gray marks as TM candidates ensures that the inevitable smudges in the TM columns do not falsely indicate the presence of a data row. This mix of conditions takes advantage of the types of imperfections expected in preprinted TM's, as opposed to those expected in the hand-printed (or machine-printed) data marks.

Figure 6:
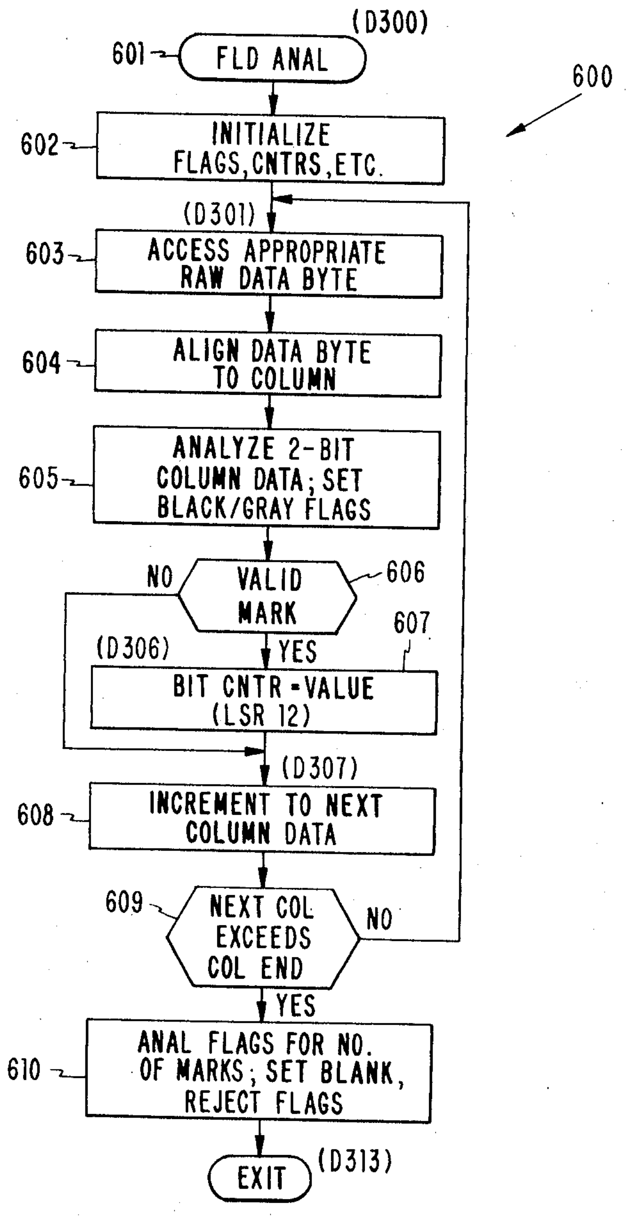
FIG. 6 details a common function useful in the invention.

When the time-out of block 553 indicates that the predetermined window distance has passed, blocks 554 and 555 reset the collection flag and set the row-process (RP) flag. Loop 500 then follows a path from block 555 through blocks 552, 509, 532, 501, 503, 504 and 505 to block 560. If the document being read has been identified as a format sheet 300, FIG. 3, by the previously stored TM flag bits and by a flag indicating that switch 114 is in a "Format Load" position, block 561 manipulates the stored data-mark signals according to a method to be described more fully in connection with FIGS. 7 and 8. Briefly, block 561 operates to construct sets of stored signals representative of the parameters marked in the various format-sheet fields. If the TM flags and the "Format Load" switch flag identify the document as a data sheet, block 562 accesses and interprets the current row according to the previously constructed sets of stored signals. This block will be detailed in connection with FIGS. 8 and 9. FIG. 6 shows a subunit which is employed in several places by both of the blocks 561 and 562. A third type of document is also used in reader 100 to perform diagnostic functions on the machine; its interpretation by block 563 does not relate to the present invention.

The completion of one of the blocks 561–563 causes all of the marks in a data-sheet row to be accessed from a storage buffer and interpreted, translated to the proper form and stored in locations in accordance with all formats applicable to that row. That is, the marks on a sheet such as 200 or 300 are processed row-by-row, and not on a field-by-field basis. The output-data storage locations for data sheets 200 are known to block 520, so that the output data may always be transferred in an orderly manner, regardless of the location of that data on the document. Block 564 resets the RP flag and increments a counter to indicate the number of rows already completed for the current document. Loop 500 then proceeds through block 506 as previously described, looking for either another timing mark or the end of the document.

Before turning to a more detailed discussion of blocks 561 and 562, it will be helpful to describe the "Field Analyze" (FA) facility 600, FIG. 6, which is employed by both of these blocks. Its purpose is to determine the number, location and type of marks which occur between two arbitrary predefined limits in a single data row. The limits are expressed as a Column Start number from 1–39 and a Column End number from 1–40.

After entering point 601, FA facility 600 first initializes certain flags, counters and other stored signals to certain states, in block 602. Block 603 obtains a data-buffer byte which includes the previously stored mark signals corresponding to the Column Start designation. If the signals for the Column Start position are not already at the left end of the accessed byte, block 604 aligns them to this position. Block 605 determines the type of mark represented by the two-bit signals at the left end of the aligned byte, and sets black-mark and gray-mark flags accordingly.

If a valid mark is present, block 606 causes block 607 to set a bit counter to a value representing the column where the mark was found. Instead of using the actual column number, this value measures the distance between the mark and the Column Start position. For instance, if Column Start = 36 and a valid mark is in column 38, the bit counter is set to 2, and not to 38. In determining whether a mark is valid, block 606 considers the first detected mark, black or gray, to be valid. Subsequent gray marks are not valid if the first mark was black. Basically, subsequent black marks are valid and supersede any previous black or gray marks. When no valid mark is found in the aligned column, block 606 transfers directly to block 608, which increments the Column Start designation to the next higher column. If this next column is not greater than the Column End designation, block 609 causes blocks 603–608 to access and analyze the next data column. This operational sequence repeats until block 609 detects that the Column End position has been reached.

When the appropriate columns have been interpreted, block 610 analyzes the flags produced by block 606. If more than one of the analyzed columns contain a valid mark, block 610 produces error (invalid marking) flags for later use. The absence of a valid mark in any of the columns produces a blank-row code. In the interest of clarity, a number of detailed error-checking functions have been omitted from FIG. 6 and from the other flowcharts.

FORMAT CONSTRUCTION

Figure 8:
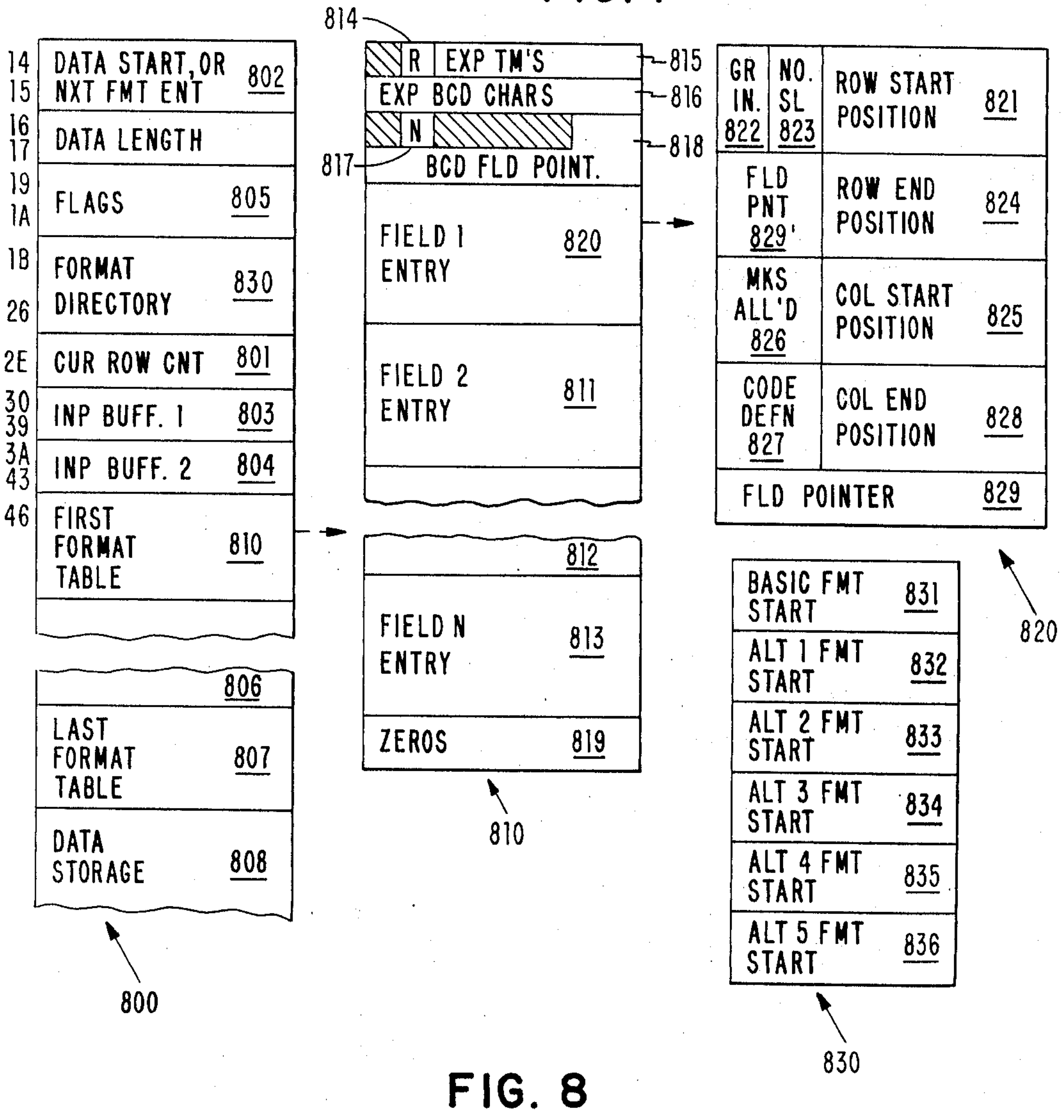
FIG. 8 is a schematic representation of a storage means useful in explaining FIGS. 7A, 7B and 9.
Figure 7A:
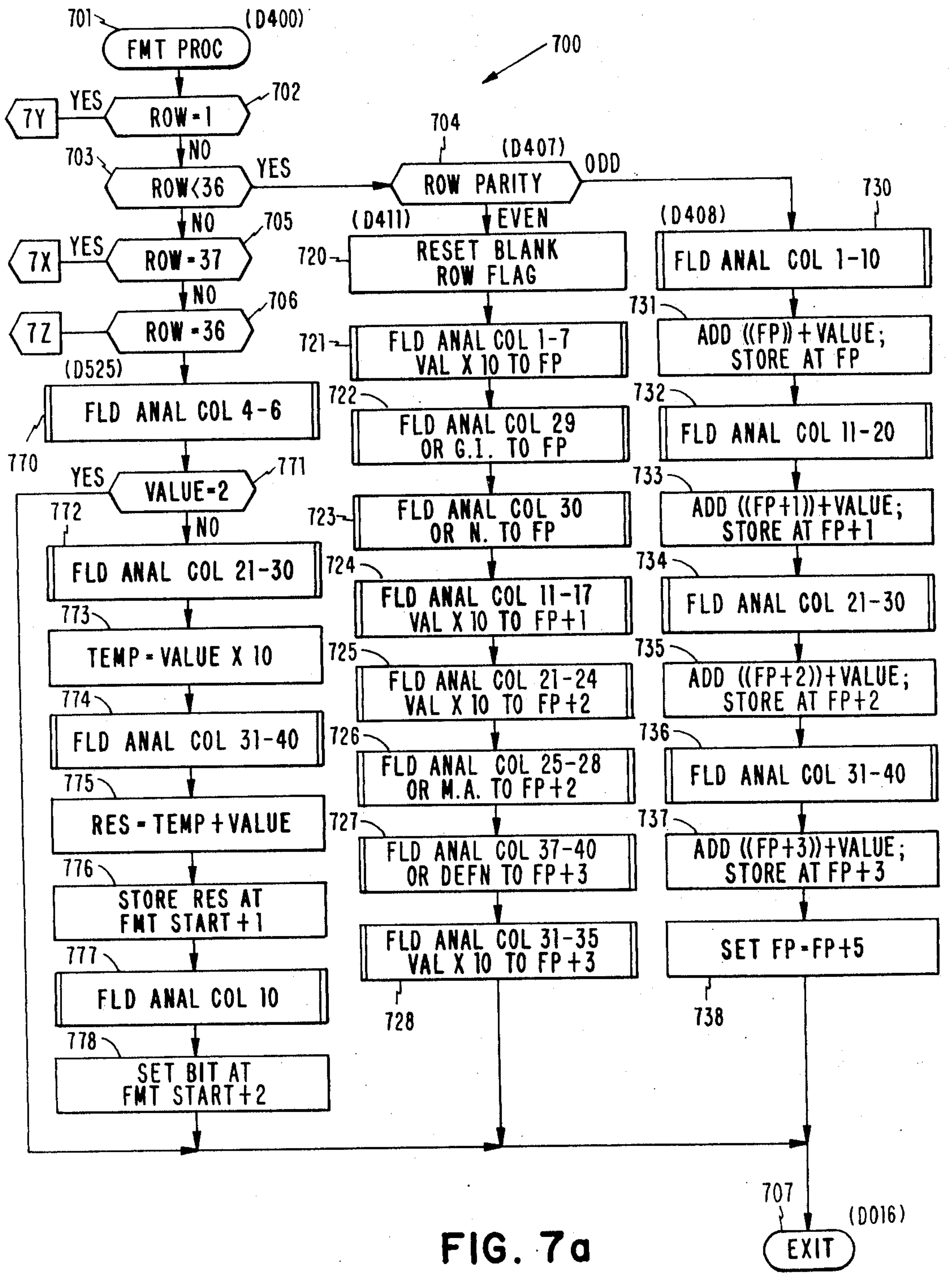
FIGS. 7A and 7B, taken together, illustrate a method for interpreting format documents according to the invention.
Figure 7B:
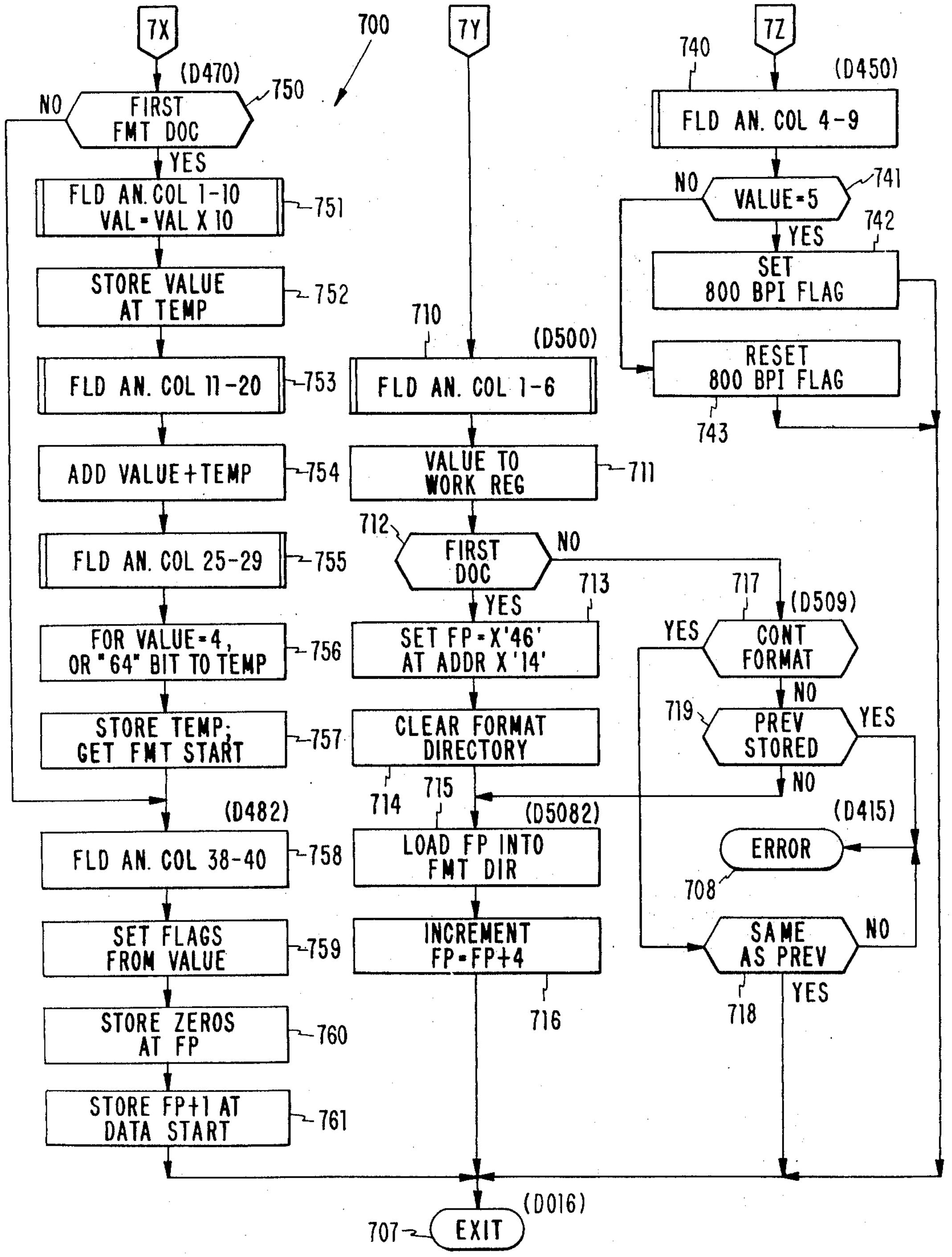

FIGS. 7A and 7B illustrate an implementation 700 for the format sheet interpreter 561, FIG. 5, which corresponds to facility 110, FIG. 1. Unit 700 retrieves signals representing the location of marks on a format sheet 300, FIG. 3, and produces sets of signals which are stored as tables and pointers in a read-write storage; a schematic map 800 of this storage is shown in FIG. 8. The stored signals subsequently control the intrepretation of data documents such as that shown in FIG. 2.

Beginning at entry point 701, a sequence of blocks 702–706 interrogate the current row count 801, stored at address hexadecimal 2E (X'2E') by block 564, FIG. 5. to determine which row of format sheet 300 is currently to be interpreted. Since the first format-sheet row specifies one of the six different data-document formats, block 710 follows block 702 when the current row count is 1. Block 710 therefore performs a field analysis 600, FIG. 6, upon Columns 1–6 of that format-sheet row. The format-number value produced by block 710 is then moved to a work register by block 711. If the current format sheet is the first document in the stack being fed by the transport, block 712 causes block 713 to initialize a format printer (FP) 802, FIG. 8, to X'46', which is the address of the beginning of a first format table 810 in storage 800. The address of the pointer itself is X'14'; the first X'13' locations of storage 800 are not used. Block 714 next clears a format directory 830 by setting the contents of storage addresses X'1B'–X'26' to zero, and block 715 loads this directory with the current value of FP.

Directory 830 contains six two-byte locations 831-836. The particular location in which FP is stored depends upon the mark detected in row 1 of the format sheet. If the first-row mark designates the sheet as pertaining to the Alternate 4 Format, e.g., FP resides at location 835, having byte addresses X'23'–X'24'. The directory is required because the length of a format table such as 810 is variable and because the tables are stored in the order of reading their format sheets, rather than in the order of their format-number designations.

Block 716 increments FP at location 802 (but not at 830) by 4 bytes to point to the first byte of first field entry 820 within table 810. Exit 707 returns to loop 500, FIG. 5, for the collection and storage of another row in one of the buffers 803 or 804. The use of two buffers is merely a matter of timing; it allows one row to be available for interpretation in one buffer while the next row is being collected from read head 101, FIG. 1, into the other buffer.

When the current format sheet is not the first in the stack, block 712 cuases block 717 to determine whether field 309 of the preceding format sheet had indicated that its format specifications were to be continued on another sheet. If so, and if the first-line marks of the two format sheets are the same, blocks 717 and 718 lead to exit 707. But block 718 otherwise leads to a conventional error-logging facility (not shown) through exit 708. The requirement that continuation format sheets carry the same format designation as the previous sheet is a safety feature for detecting an incorrect placement of the sheets in the transport stack. It is also an error when two sets of format sheets pertain to the same format. Thus, if the previous sheet did not expect a continuation, block 717 asks block 719 to determine whether a format having the same designation in field 302 had previously been stored. Block 719 exits through 708 when this is the case. But a successful completion of this test leads back to block 715 and thence through 716 to the normal exit 707.

The next entry to point 701 occurs after the second format-sheet row has been collected by block 551, FIG. 5. Reference to FIG. 3 shows that each of the even-numbered rows from 2 through 35 contain fields 307, 308, and the high-order (tens) digit of fields 303–306, which specify the boundaries of a particular data-sheet field such as 210–240, FIG. 2. The detection of row count = 2 by blocks 702–704 first causes block 720 to reset a blank-row flag in preparation for constructing a part of the entry 820 for the first data-sheet field of the current format. Block 721 performs a field analysis upon Columns 1–7 of row 2, which represents the tens digit of the Row Start field 303. The value, 0–6, of the mark in one of these columns is multiplied by 10 and stored in the low-order six bits of location 821 addressed by the format pointer FP. Next, block 722 analyzes column 29 in field 307 to determine the "gray indicate" bit, which is then OR'ed into the high-order bit 822 of the byte addressed by FP. Block 723 similarly determines the "no select" bit from column 30 in field 307, and OR's it into the second bit 823 of the same byte. Columns 11–17, the tens digit of Row End field 304, is analyzed, multiplied by 10 and stored in six bits 824 of the following byte (address = FP + 1) by block 724. Block 725 processes Columns 21–24, from Column Start field 305, in the same manner, but stores this value at 825, which has an address FP + 2. Block 725 analyzes Marks Allowed field 307 in Columns 25–28, and OR's the resulting binary number 0–3 into the two high-order bits 826 of the same byte. The field-code definition is similarly analyzed from Field Type field 308 and OR'ed into location 827 at address FP + 3. After block 727 has completed that task, block 728 stores the tens digit of Column End field 306 into the low-order six bits 828 of byte FP + 3. Finally, exit 707 again returns to block 564 for the collection of the third row of marks.

The third row of format sheet 300 contains the unit digits of the boundary fields 303–306. Thus, the next entry through point 701 finds an odd-numbered row less than 36, and passes control to block 730. The value of the units-digit mark found in Row Start field 303, Columns 1–10, is then added to the existing contents ((FP)) of the location 821 at address FP. Block 731 also stores the result back into location 821, so that this location now contains a binary representation of the two decimal digits which select the beginning row of the first data-sheet field entry 820 for the first format table 810. Blocks 732, 734 and 736 analyze Columns 11–20, 21–30 and 31–40 of fields 304, 305 and 306 in the same manner. Blocks 733, 735 and 737 add the respective mark values to the contents ((FP + 1)), ((FP + 2)) and ((FP + 3)) of locations 824, 825 and 828, and place the sums back into the same locations. Block 738 increments the FP value by 5 in preparation for the next entry. The contents of the field-pointer locations 829 and 829′ are not determined at this point; the construction and use of this pointer will be explained in connection with FIG. 9.

Succeeding pairs of format sheet rows set the contents of further field entries 811, 812, etc. to 813 in the same manner as described above, under the control of row-parity block 704.

When the contents of location 801 signals a row count of 36, blocks 703, 705 and 706 divert control to block 740, FIG. 7B. Columns 4–9 of this row contain bubbles only in the "0" and "5" numeric positions, and correspond to desired tape recording densities for output-storage unit 103 of 1,600 and 800 bits per inch (BPI) respectively. Therefore, a value = 5 marked in field 312 enables block 741 to cause block 742 to set and "800BPI" flat bit in a flag-byte storage register. Otherwise, block 743 resets this flag bit. Since field 312 is the only field in row 36, blocks 742 and 743 exit to point 707.

The penultimate format-sheet row, row 37, enables block 750, via blocks 702, 703 and 705. If the current format document is the first sheet for a particular format, block 751 determines the tens digit of the Expected Timing Mark Count, field 311, and multiplies its value by 10. Block 752 stores the multiplied value in a temporary location. The units digit of field 311 is found by analyzing Columns 11–20, block 753, and added to the tens digit in block 754. Block 755 analyzes Columns 25–29 of Identifier field 310; the placement of the two bubbles in this field means that block 755 returns a result of either 0 or 4. The latter value signifies that the data-sheet columns are to be coded in a reverse order, and block 756 accordingly causes a Reverse (R) flag to be produced. This flag is set by Oring a 1 into the second bit ("64" bit) of the aforementioned temporary storage location. Otherwise, this bit retains its initial value of 0. Block 757 obtains the format-start address (X′46′ for the first format) from directory 830, and stores the contents of the temporary location into 814 and 815, both located in the first byte of table 810. The two high-order bits of this byte are not used.

Columns 38–40 of row 37 correspond to the Continuation field 309. A mark value =2 produced by analysis block 758 indicates that the present sheet is the last one for the current format. Block 759 accordingly sets flags in a register for use by block 717, as has been discussed. Otherwise, the flags remain their initial states. Block 760 stores a byte of zeros at location 819 to indicate the end of table 810. Block 761 then stores FP + 1 at data-start location 802. That is, FP now points to the next available location in storage 800. This completes the interpretation of row 37, and leads 707.

When format-sheet row 38 has been collected, an entry at point 701 transfers control through blocks 702, 703, 705 and 706 to analyses of the three parts of the BCD specification field 313. Block 770 first analyzes Columns 4–6 to return a value of either 0 or 2. The latter value indicates that the "No-BCD-Field" bubble has been marked. In this case, the remaining parts of field 313 do not apply, so block 771 transfers directly to exit 707. If a BCD-coded field is to be read from the data documents specified by the current format sheet, block 772 analyzes Columns 21–30 to find the tens digit of the expected number of BCD characters to be placed in the data-sheet field, and block 773 stores 10 times the value returned by block 772 in a temporary location. Columns 31–40 contain the units digit of the expected count, so the value found in block 774 is added to the contents of the temporary location by block 775. Block 776 then retrieves the address of the second byte 816 of table 810 from the appropriate one of the locations 831–836 in directory 830, and stores the result of block 775 in location 816. Block 777 analyzes the "BCD No Select" format field. If Column 10 has a mark, block 778 sets a bit at location 817. A 10-bit BCD field pointer in the 1¼-byte location 818 will be produced at a later time. The output of block 778 is to exit 707.

This completes the interpretation of one format sheet 300. Additional format sheets are read and interpreted in the same manner, but their tables 806, etc., to 807 have different addresses in the storage 800, and the start address of these tables is placed in a different one of the locations 831–836 of directory 830. At the end of the last format sheet in the stack placed in document transport 102, storage location 802 contains the address of the location just beyond the end of the last format table 802. This address is retained and used by data-sheet facility 111 as a pointer to the starting address of a data-storage area 808. Turning off the Format-Load switch 114 and removing the format sheets then readies machine 100 for the reading of data documents according to the constructed format tables.

FORMAT USE

Figure 9:
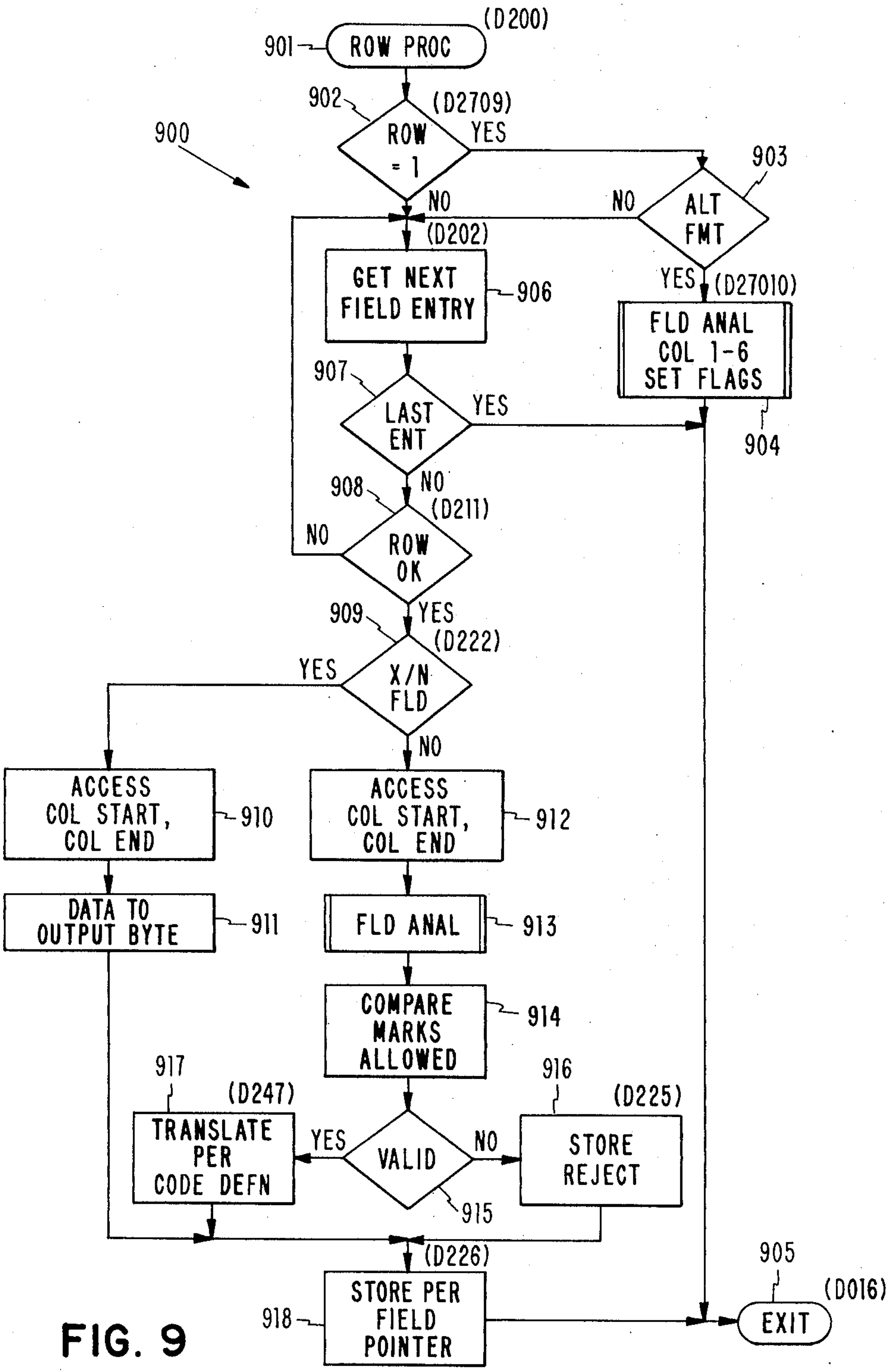
FIG. 9 shows a method according to the invention for assembling output records from data documents.

Data-sheet interpreter 900, FIG. 9, is an expansion of block 562, FIG. 5, and corresponds to facility 111, FIG. 1. Its purpose is to control the reading of data documents such as 200 according to signals placed in storage 800 by the interpretation of format documents 300 in block 561. The latter block has been detailed in FIGS. 7A and 7B.

Interpreter 900 begins at entry point 901. Since the first row of a data sheet may contain either data marks or a mark representing its format designation, block 902 enables block 903 during this row. If the data sheet contains a timing mark in Column TM2 only, block 903 causes block 904 to analyze Columns 1–6 and to store a value 0–5 in these bits of location 805 indicating which of the format tables, addressed by directory locations 832–836, applies to the current data sheet. Since no other field may occupy the first row in this case, exit 905 returns directly to block 564, FIG. 5. But, if the first row has a timing mark in Column TM1 only, the current data sheet is assigned by default to the basic format, whose table is addressed by directory location 831. Again, the use of directory 830 allows the format tables 810, 806, etc., 807 to be read and stored in an arbitrary order.

For the "NO" outputs of blocks 902 or 903, block 906 obtains a field entry from the proper table, such as entry 820 of table 810. Unless the last entry of that table has already been accessed, block 907 causes block 908 to determine whether this entry applies to the current data-sheet row. If the current row count in location 801 does not lie between the Row Start and Row End positions specified in locations 821 and 824, block 908 returns to block 906 for the interrogation of another entry 811. This sequence repeats until block 907 finds that the last entry 813 has been accessed, or until the row boundaries of a field entry embrace the current row.

In the latter case, block 909 asks whether or not location 826 of the proper entry 820 has been coded to allow multiple marks in that field. If the field is such an "X/N" field, block 910 accesses the Column Start and Column End designations from 825 and 828, and block 911 moves all mark data between these columns to an output storage location without any code translation. That is, each column of each row of this type of field is merely stored as an image containing a string of ones (mark) and zeros (no mark). Seven columns are stored in each byte. X/N fields do not occur frequently; this "image mode" is included primarily to allow a user to employ specialized coding by means of a program in CPU 104, FIG. 1. Field Analyze facility 600 is not used for X/N fields.

For the other field types, block 912 obtains the six bits of each storage location 825 and 828, and supplies them to analysis block 913. Block 913 operates as shown in FIG. 6 to produce a numerical result representing the position of any valid mark occurring between the boundaries specified by Column Start and Column End. It also produces flags indicating the number and type of marks detected within these limits. Block 914 compares the flags with the code stored in Marks Allowed location 826. A binary value 00 at 826 signifies that one and only one mark (1/N) is to appear in the current row, and is used for data-sheet fields which are required to be marked in every row, such as field 210, FIG. 2. A code value 01 requires either no marks or one mark per row (0–1/N field). It is useful for variable-length data, such as that in "Name" field 220. Code 10 represents an X/N field and is employed by block 909 instead of 914. Code 11 is for a "one-or-blank" (1B) field. The requirements for this type of field are that every row have one and only one mark if the first row of the field has one mark. If the first row has no mark, then all subsequent rows must also be blank. Such a field may be employed for optional or alternative information which is selected by marking the first row of one or more different fields which may apply. This type of field is an example of a format specification which occurs partly on a format sheet and partly on a data document, since the first row of a 1B data field specifies the allowable contents of the remainder of that data field. The detection of an invalid marking condition in the current row by block 915 enables block 916 to produce a special "reject" code and stores it for later use. Block 915 also utilizes the Gray Indicate bit, at 822, to determine validity of the marks.

Block 917 translates validly marked rows to an output code whose type is determined by the field-code definition at the two-bit storage location 827. For a binary value 00 in 827, no translation is made. As a cross-check, this value also requires the specification of an X/N data field in Marks Allowed format field 307. Definition-bit values 01 signify that the mark in each row is to be translated to an output code representing a decimal digit; i.e., the field is a "numeric" (N) field. An alphabetic (A) field is designated by a value 10 at location 827; each row of this field is translated to a representation of a single alphabetic character. Value 11 indicates an alphanumeric (A/N) field in which each row is converted to either a character or a number. The N, A and A/N fields are normally all translated to the same output code such as EBCDIC or ASCII, but of course the entry code from block 913 is different for the various kinds of fields. A mark in the first column of an A field, for instance, may be translated to the output code for the letter "A," while the same mark is translated to an output code for the numeral "0" in an A/N field. Block 917 also uses the R flag 814 in its translation.

Block 918 stores the translated, reject or X/N-field code in data area 808 of storage 800. Field pointer 829, 829' contains the particular address in area 808 at which the output code byte is placed. Being 10 bits long, the field pointer may specify any one of 1,024 locations; 829 contains the 8 least significant bits, while 829' carries the two most significant bits. Block 918 increments the pointer after storing a byte, so that successive codes from the same data-sheet field are placed in contiguous locations. Exit 905 then returns to block 564, FIG. 5.

It was stated earlier that the field pointers for a data sheet are determined by block 510, FIG. 5, at the beginning of that sheet, rather than during the format-construction phase described in FIGS. 7A and 7B. This is merely a matter of storage allocation, and may be performed in many different ways. In the present embodiment, block 510 produces a field-pointer value for each field entry of each format table in the following manner.

When block 509 detects the end of a data document, the field pointer 829 (including the two high-order bits 829', unless stated otherwise) of each entry, such as 820, is one higher than the address of the last output-record byte in location 808 at which the corresponding data field was stored. Therefore, pointer 829 must be initialized to the beginning of the output-record storage for this data field, before the next data sheet is read. Block 510 first obtains the Basic Format start address from location 831 of directory 830, and stores the contents of location 802 in location 829 of the first field entry 820. (If location 831 contains all zeros, no basic format has been specified, and this step is skipped.) If location 826 specifies the first data field as an X/N field, the field pointer of the next field entry 811 is computed by adding the result of the X/N data-length formula, above, to the contents of location 829. Otherwise, the contents of 829 are added to the value (RowEnd-RowStart + 1) and stored as the field pointer of entry 811. The field pointer of the third entry is similarly obtained from the second-field printer, and so forth. When block 510 detects the format delimiter byte 819, the result of the computation on the pointer for the last field entry 813 is stored in a BCD-Field pointer 818 of format table 810. That is, the data from a BCD field or a data document always occurs at the end of the output record for that format.

The field pointers for the Alternate Formats are determined in the same way, except that the format start address is taken from one of the directory locations 832–836, rather than from 831. Since a single data document uses only one of the format tables, only one output record is assembled for that document. But, since documents of different formats may be intermixed with each other, the output records may differ from document to document. Every record starts at the data-start address specified by storage location 802; the length of the records, however, may not be the same. As has been explained, each output record contains a number of bytes of binary data assembled from the data-document marks according to a format table. The length of an entry for each data-document field is calculated, and a series of field pointers specify the location in the record at which the data is placed. It will be noted that this placement is determined by the order of the entries 820, 811, 812, etc. 813, which in turn is determined by the order in which the specifications were made on format sheet 300. It does not depend upon the position of the corresponding data fields on document 200; this allows the optimization of both the output-record form and the data-sheet layout. BCD data fields always appear at the end of an output record in the present embodiment, although this is not a necessary limitation.

IMPLEMENTATION DETAILS

The foregoing description is sufficient to allow those skilled in the art to make and use the invention in several different forms, including digital or analog circuits, programming for a general-purpose data processor, or even non-electrical implementations. The presently preferred embodiment, however, contemplates that various facilities required by the invention reside in a fixed array of storage elements and are executed by a control processor 105, FIG. 1. Such processors are sometimes also termed digital controllers, special-purpose computers or microprogram control units. They differ from general-purpose computers primarily by their organization for sensing and controlling arbitrary types of physical processes directly. Although rich in logic and signal-transfer operations, they generally have a limited arithmetic capability, sometimes none at all. In effect, they function as a set of logic circuits whose interconnections are determined by storage cells rather than by wires. Their rapidly declining costs have led to their use for many control applications heretofore implemented in other ways.

Figure 4:
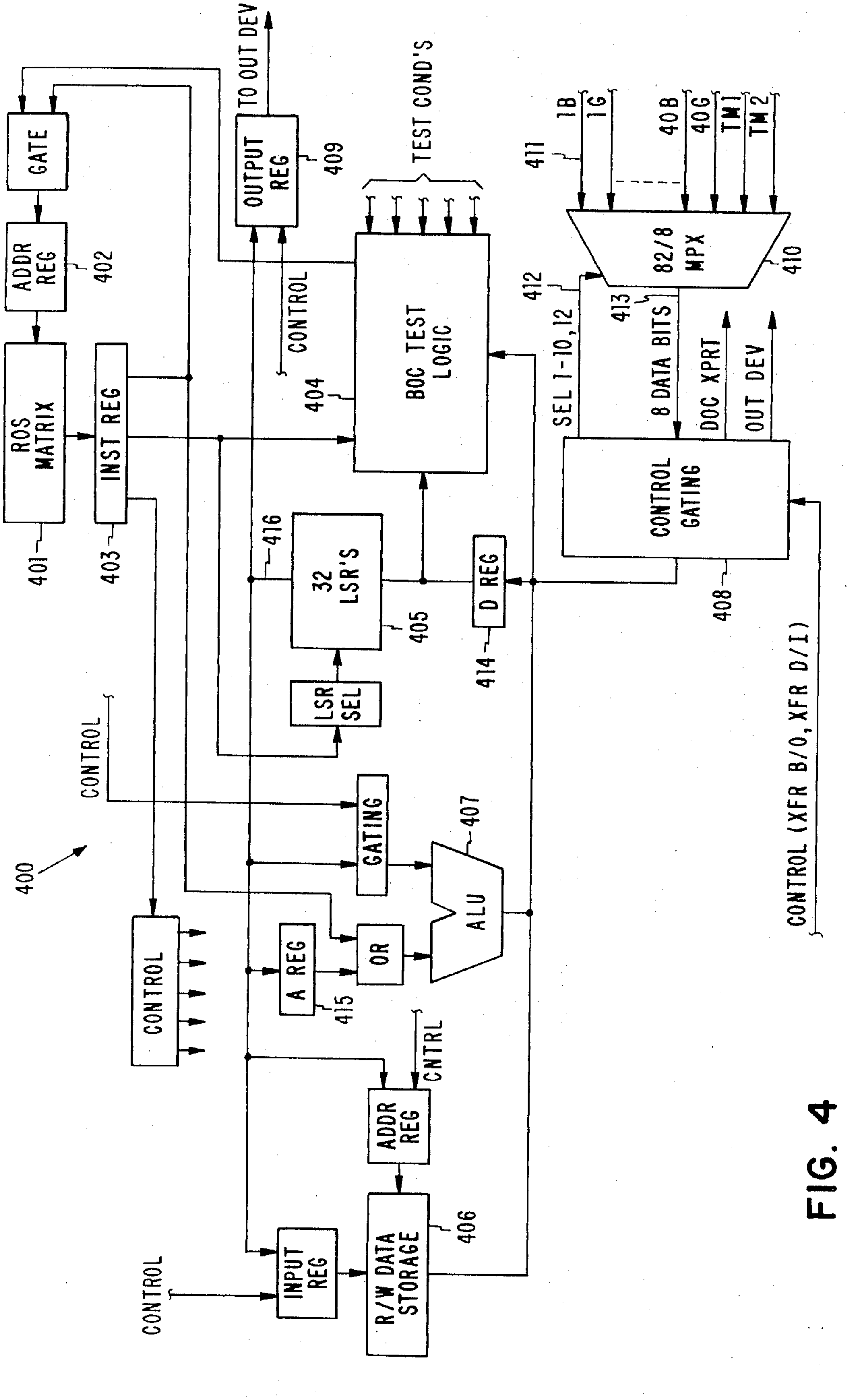
FIG. 4 is an example of a controller or processor useful in the invention.

FIG. 4 shows a conventional example 400 of one of the many types of configuration useful for control processor 105. Read-only storage (ROS) 401 contains a matrix for holding the facilities 109–113, FIG. 1. Address register 402 controls the transfer of certain ROS signals to instruction register 403. Some of these signals are gated through control circuits 403 to various points in the processor. Others are fed back to register 402 for ROS sequence control. Still others select branch-on-condition (BOC) test circuits 404, which receive signals concerning the states of processor 400 and of the physical process being controlled. Table 1 hereinbelow shows the instruction types which may appear in register 403. Table 2 lists the locations specifiable by the "Transfer" (XFR) instruction of Table 1. BOC tester 404 also influences register 402. The specific conditions used in this application are listed in Table 3 hereinbelow. Variable data are stored in 32 local storage registers (LSR) 405 and in read-write storage 406, whose contents for the present invention are shown by map 800, FIG. 8. Arithmetic-logic unit (ALU) 407 provides a facility for transforming data under the control of logic 403.

Control gating 408 is coupled to logic 403 for handling the flow of signals into and out of processor 400. Most of these signals are irrelevant to the present invention. Multiplex switch 410, physically located in adapter 106, also connects to gating 408. The function of this switch is to sequentially transmit the 82 signals from the 42 channels of read head 101 to the 8-bit wide data path of processor 400. The 82 input lines are divided into 10 groups of 8 each. The first group comprises the lines for the black signals from the first 4 data channels 1B–4B and for the gray signals from those channels, 1G–4G; the second group contains the lines for signals 5B–8B and 5G–8G, and so forth. A twelfth byte carries only the two black signals from the timing-mark channels TM1 and TM2. The eleventh byte is not used. Four-bit selection signals on lines 412 thus control which of the groups 1–10 or 12, of input signals 411 are to be passed into processor 400 through data lines 413.

Referring to the instruction set of Table 1 in more detail, the "Store LSR" instruction STO has an operation code of 0. Field 1 contains bits 3–7 for the address of the LSR (0–31) into which the contents of the field 2 is stored. Field 2 contains the contents to be stored in the LSR location designated by field 1. The D register 414 is set to the contant in field 2 and the A register 415 is set to 0 at the start of the instruction. Upon execution, the STO instruction selects the LSR 405 as defined and places the field 2 data in the D register 202 and the contents thereof is then placed in the LSR selected.

The "Branch Unconditionally" instruction BU has an op-code of 3. Field 1 contains the five high-order bits of a 13-bit address for ROS 401. These bits define which 256-byte page in ROS 205 will be addressed. Field 2 contains the eight low-order bits of the 13-bit address for ROS 401. These bits define the address within the page designated by field 1. The BU instruction thus causes the ROS address register 402 to be set to the contents of fields 1 and 2.

The "Branch On Condition" instruction BOC has an op-code of 1. Field 1 contains the encoded form of one of 32 conditions which, when met, causes a branch to the address in field 2. When the branch condition is not met, the next sequential instruction is executed. Field 2 contains the address, within the same page in which the BOC OCCURS, to which ROS address register 402 is set if the condition specified by field 1 is met. The BOC instruction logically compares the information specified by field 1 and the actual machine condition by means of hardware circuits to determine condition met or not met.

The "Transfer" instruction XFR has an op-code of 2. Bits 3–7 of field 1 define which of the 32 LSR's are involved in the operation. Bits 8–15 of field 2 name one of the 25 units listed in Table 2. Only a few of these are involved in the present invention. The transfer instruction transfers information into or out of the selected LSR, from or to one of the 25 units defined in field 2.

The instructions "Logic And Immediate" (AND) and "Logic And Mask" (ANDM) have op-codes C and D respectively. The AND instruction modifies the contents of the selected LSR by storing the generated information from D register 414 into the LSR. The ANDM instruction does not modify the contents of the selected LSR. The A register 415 is set to 0 at the end of the operation. These two instructions place the contents of the selected LSR onto bus 416. The contents of field 2 are ORed with the contents of register 415. The result is then ANDed with the data from on bus 416 and the output from ALU 407 is placed in register 414.

The logic instructions ORI and ORM have op-codes 8 and 9 respectively. ORI modifies the contents of the selected LSR by storing the generated information from register 414 in the LSR. ORM does not modify the contents of the LSR. Register 415 is set to 0 following the execution of either instruction. Field 1 of the instruction contains the address of the LSR byte which is placed on bus 416. Field 2 contains a constant which is ORed with the contents of register 415. When the instructions are executed, the contents of the selected LSR is placed on bus 416. The contents of field 2 is ORed with the contents of register 415 and the ALU 407 output is placed in D register 414.

The "Exclusive Or" XO and "Exclusive Or Mask" XOM instructions have op-codes E and F respectively. XO modifies the contents of the selected LSR by storing the generated bus 416 information in the LSR. XOM does not modify the contents of the LSR. Register 415 is set to 0 following the execution of either instruction. Field 1 contains the address of the LSR byte which is placed onto bus 416. Field 2 contains a constant to be ORed with the contents of register 415. When the instructions are executed, the information of the selected LSR is transmitted to bus 416. The information in field 2 is ORed with the contents of register 415. The signals from 416 and from register 415 is exclusive-OR'ed in ALU 407. The output of ALU 407 is placed in register 414.

The "Arithmetic Add" ADD and "Arithmetic Add Mask" ADDM instructions have op-codes A and B respectively. The ADD instruction modifies the contents of the selected LSR by storing data from register 414 in the LSR. ADDM does not modify the contents of the selected LSR. Register 415 is set to 0 following the execution of either instruction. Field 1 contains the address of the LSR byte to be placed on bus 416. Field 2 contains a constant to be OR'ed with the data register 415. These instructions place the information from the selected LSR on bus 416 and OR the constant in field 2 with the contents of register 415. These data are added in ALU 407, and its output is placed into register 414.

With the foregoing as a background, the attached shows a specific implementation of facilities 109–111, FIG. 1, according to the operational descriptions given in connection with FIGS. 5–9. The listing as shown is actually written in IBM System/360 Assembler Language, using macro instructions to define the instruction set of processor 400. This language and its macro facilities are described in, for example, IBM Systems Reference Library Form No. GC28–6514. The "OP" column therefore includes operation-code mnemonics as explained in connection with Table 1. The "OPERANDS" column gives the symbolic names of the instruction operands in accordance with the "NAME" column, and in conformance with the definitions in Tables 1–3. For convenience in correlating the flowcharts, the symbolic names corresponding to the first instruction of certain blocks are shown above and to the right of those blocks in FIGS. 5, 6, 7A, 7B and 9. The embodiment shown herein is also discussed in IBM Systems Reference Library Form Nos. GA21-9127-0, GA21-9143-0, GC20-1750-0 and GC20-1751-0.

It has already been stated that the present invention may be realized in many different implementations and in various technologies. Those skilled in the art will also find many obvious modifications which are within the spirit and scope of the present invention. Therefore, having described a preferred embodiment thereof, we claim as our invention:

TABLE 1

INSTRUCTION SET (FORMAT: OP CODE/FIELD 1/FIELD 2)

0 1 2 3 4 5 6 7 8 9 10 11 12 13 14 15

| | | |
|---|---|---|
| (0)STO | /LSR ADDRESS | /CONSTANT |
| (1)BOC | /TEST CONDITION | /LOW ROS ADDRESS |
| (2)XFR | /LSR ADDRESS | /LOCATION |
| (3)BU | /HI ROS ADDRESS | /LOW ROS ADDRESS |
| (8)ORI | /LSR ADDRESS | /CONSTANT |
| (9)ORM | /LSR ADDRESS | /CONSTANT |
| (A)ADD | /LSR ADDRESS | /CONSTANT |
| (B)ADDM | /LSR ADDRESS | /CONSTANT |
| (C)AND | /LSR ADDRESS | /CONSTANT |
| (D)ANDM | /LSR ADDRESS | /CONSTANT |
| (E)XO | /LSR ADDRESS | /CONSTANT |
| (F)XOM | /LSR ADDRESS | /CONSTANT |

TABLE 2

TRANSFER LOCATIONS

| | | |
|---|---|---|
| LSRS | EQU | X'05' SELECT THE HIGH OR LOW LSR'S |
| INHPB | EQU | X'06' INHIBIT PARITY ON THE 'B' BUS |
| TUADR | EQU | X'24' ADDRESS SELECTION OF MPX SWITCH |
| AR | EQU | X'21' LSR TO A REGISTER |
| TUBOO | EQU | X'42' LSR TO MPX SW (ODD PARITY) |
| TUBOE | EQU | X'41' LSR TO MP SW (EVEN PARITY) |
| TUTAG | EQU | X'28' LSR TO MPX SW TAG REG |
| SDC1 | EQU | X'48' FIRST SKEW DETECTION AND CONTROL |
| RESET | EQU | X'44' RESET CHECK/RESET LATCH |
| ABI | EQU | X'60' LSR TO I/O BUS IN REGISTER |
| INTAG | EQU | X'50' LSR TO I/O TAG REGISTER |
| IC | EQU | X'22' LSR TO INSTRUCTION COUNTER |
| SKB | EQU | X'90' MPX SWITCH DATA TO LSR |
| PET | EQU | X'88' PHASE ERRORS BY TRACK TO LSR |
| ABO | EQU | X'AO' I/O BUS OUT TO LSR |
| DREG | EQU | X'81' TRANSFER THE 'D' REGISTER TO AN LSR |
| SHIFTRT | EQU | X'84' SHIFT RIGHT ONE POSITION |
| SPOUT2 | EQU | X'OA' SPARE OUTBOUND REGISTER |
| WRTCLOCK | X'11' | |
| EQU | ACTIVATE OR DE-ACTIVATE THE WRITE CLOCK | |
| SDC3 | EQU | X'12' NRZI SKEW DETECTION |
| SDC2 | EQU | X'18' SECOND SKEW DETECTION AND CONTROL |
| | | X'82' R/W BUFFER DATA TO LSR |
| | | X'09' LSR TO R/W BUFFER |
| | | X'14' SET BUFFER DATA SELECT |
| | | X'10' XFR ENABLE CHANGE |

TABLE 3

BRANCH CONDITIONS

| | | |
|---|---|---|
| ALUO | EQU | X'00' ALU OUTPUT IS EQUAL TO 0 |
| NC | EQU | X'01' NOT ALU CARRY OUT |
| BBUS | EQU | X'02' B BUS PARITY ODD |
| DBUS | EQU | X'03' D BUS PARITY ERROR |
| INTRPT | EQU | X'04' INTERRUPT FROM THE TAPE UNIT |
| SP1 | EQU | X'05' SPARE BRANCH ON CONDITION |
| TACH | EQU | X'06' TACH |
| XFRWTDA | EQU | X'07' TRANSFER THE WRITE DATA |
| CRO | EQU | X'08' CHECK RESET OUT |
| SNS | EQU | X'09' FEED & NORM STACKER (S/3) |
| SIO | EQU | X'0A' RESET TRANSFER ERROR (S/3) |
| LIO | EQU | X'0B' REREAD ENABLE (S/3) |
| PBE | EQU | X'0C' P-BIT ENVELOPE |
| NDATRDY | EQU | X'0D' SKEW BUFFERS EMPTY |
| BOB | EQU | X'0E' BEGINNING OF RECORD//HARDWARE READY (MOD. 1) |
| IBG | EQU | X'0F' END OF RECORD DETECTED |
| DREG0 | EQU | X'10' D REGISTER BIT 0 |
| DREG1 | EQU | X'11' D REGISTER BIT 1 |
| DREG2 | EQU | X'12' D REGISTER BIT 2 |
| DREG3 | EQU | X'13' D REGISTER BIT 3 |
| DREG4 | EQU | X'14' D REGISTER BIT 4 |
| DREG5 | EQU | X'15' D REGISTER BIT 5 |
| DREG6 | EQU | X'16' D REGISTER BIT 6 |
| DREG7 | EQU | X'17' D REGISTER BIT 7 |
| NCO | EQU | X'18' NOT COMMAND OUT TAG//READ CALL (S/3) |
| ADO | EQU | X'19' ADDRESS OUT TAG |
| NSVO | EQU | X'1A' NOT SERVICE OUT//FEED & SELECT STACKER (S/3) |
| SP3 | EQU | X'1B' S/3 SERV RESP |
| NSKEW | EQU | X'1C' NOT EXCESSIVE SKEW |
| TM | EQU | X'1D' TAPE MARK |
| NCUFEAT | EQU | X'1E' DUAL DENSITY FEATURE INSTALLED |
| SP4 | EQU | X'1F' ENABLE JUST SWITCHED ON |

We claim:

1. A system for reading data indicia according to one selected format of a plurality of alternate formats, said system comprising:

a data document for holding data indicia and including format-selection indicia distinguishable from said data indicia;

a plurality of format documents each having format fields adapted to be marked with format indicia for specifying particular attributes of said data documents, one of said format fields being a format-designation field;

means for constructing a plurality of format configurations from respective ones of said format documents, each of said configurations having a format identification derived from said format-designation field of its respective format document; and means for constructing a data record from said data document in response both to said data indicia and to a selected one of said format configurations, said one configuration being that whose identification corresponds to said format-selection indicia.

2. The system of claim 1, wherein said format selection indicia comprise at least one visible mark.

3. The system of claim 2, wherein said means for constructing a data record is adapted to select said one format configuration in response to the position of said one mark on said data document.

4. The system of claim 3, wherein said means for constructing a data record is adapted to respond to said one mark only in the presence of a further visible mark on said data document.

5. The system of claim 1, wherein said means for constructing format configurations is adapted to produce said format identification in response to the position of a visible mark in said format-designation field.

6. The system of claim 5, wherein said format document has a preprinted label for identifying said format-designation field.

7. A method for reading a data document according to one of a plurality of prescribed formats, said method comprising:

recording format indicia from a plurality of format documents as format signals in a document reading means;

assembling said format signals into a corresponding plurlaity of format configurations;

subsequently recording data indicia and format-selection indicia from said data document as data signals and format-selection signals in said reading means;

selecting one of said format configurations in response to said format-selection signals; and assembling said data signals into a data record in accordance with said one format configuration.

8. The method of claim 7, comprising the further step of producing said format-selection signals in response to an enabling mark on said data document.

9. The method of claim 8, comprising the further step of producing said format-selection signals in response to the position of a visible mark on said data document.

10. The method of claim 7, wherein said one format configuration is selected in accordance with predetermined format-designation indicia recorded from respective ones of said format documents.

11. The method of claim 10, wherein said format configurations are assembled by storing said format signals in a plurality of tables, said tables having different characteristics derived from said format-designation indicia of their respective format documents.

12. The method of claim 11, wherein said characteristics are the respective locations of said tables in a storage array.

13. The method of claim 12, wherein said one format configuration is selected by accessing the location of its table from a stored directory of the locations of said tables.

14. The method of claim 11, comprising the further steps of assembling a directory derived from said characteristics, and accessing said directory with said format-selection signals.

* * * * *